United States Patent
Nakagawa et al.

(10) Patent No.: US 8,596,871 B2
(45) Date of Patent: Dec. 3, 2013

(54) SLIDE BEARING FOR CRANKSHAFT OF INTERNAL COMBUSTION ENGINE

(75) Inventors: Takahito Nakagawa, Inuyama (JP); Tomohiro Ukai, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 133 days.

(21) Appl. No.: 13/166,188

(22) Filed: Jun. 22, 2011

(65) Prior Publication Data

US 2012/0008889 A1 Jan. 12, 2012

(30) Foreign Application Priority Data

Jul. 7, 2010 (JP) .................. 2010-154475

(51) Int. Cl.
*F16C 33/10* (2006.01)
*F16C 9/02* (2006.01)

(52) U.S. Cl.
USPC ............................. 384/288; 384/286; 384/294

(58) Field of Classification Search
USPC .................. 384/288, 291, 294, 429
See application file for complete search history.

(56) References Cited

U.S. PATENT DOCUMENTS

| | | |
|---|---|---|
| 2005/0196084 A1 | 9/2005 | Kitahara et al. |
| 2011/0002563 A1 | 1/2011 | Taguchi et al. |
| 2012/0148179 A1* | 6/2012 | Kondo et al. ................. 384/286 |

FOREIGN PATENT DOCUMENTS

| | | | |
|---|---|---|---|
| DE | 2537046 A1 * | 3/1977 | .............. F16C 17/02 |
| DE | 4013378 A1 | 10/1990 | |
| EP | 2078875 A1 | 7/2009 | |
| GB | 2112475 A | 7/1983 | |
| GB | 2230826 A | 10/1990 | |
| JP | 4-63810 U | 5/1992 | |
| JP | 9303372 A | 5/1996 | |
| JP | 8-277831 A | 10/1996 | |
| JP | 2005-69283 A | 3/2005 | |
| JP | 2008-95858 A | 4/2008 | |
| WO | 2008011860 A1 | 1/2008 | |
| WO | 2009/128538 A1 | 10/2009 | |

OTHER PUBLICATIONS

Search report issued by the United Kingdom Intellectual Property Office in application GB1111592.0 on Nov. 1, 2011.

* cited by examiner

*Primary Examiner* — Thomas R Hannon
*Assistant Examiner* — Yamilka Pinero Medina
(74) *Attorney, Agent, or Firm* — Browdy and Neimark, PLLC

(57) ABSTRACT

There is provided a slide bearing for a crankshaft of an internal combustion engine, having a pair of half bearings combined with each other to form the slide bearing, and a crush relief formed in each end portion region in a circumferential direction of an inner peripheral surface of each half bearing by reducing a bearing wall thickness over an entire width in an axial direction of the half bearing, wherein a relief depth RD which is a reduction amount of the bearing wall thickness of the crush relief is maximum at each end portion in the circumferential direction of the half bearing, and gradually decreases toward a center in the circumferential direction, and the relief depth RD is maximum in a center in an axial direction of the half bearing, and gradually decreases toward both end portions in the axial direction.

6 Claims, 5 Drawing Sheets

SLIDE BEARING FOR CRANKSHAFT OF INTERNAL COMBUSTION ENGINE

BACKGROUND OF THE INVENTION

1. Field of the Invention

The present invention relates to a slide bearing for a crankshaft of an internal combustion engine, which slide bearing is configured into a cylindrical shape by combining a pair of half bearings.

2. Description of Related Art

In general, a crankshaft of an internal combustion engine is supported, at each journal portion thereof, by a main bearing constituted of a pair of half bearings provided in a cylinder block lower portion of the internal combustion engine. In order to lubricate the main bearing, a lubricating oil is supplied by an oil pump into a lubricating oil groove formed in a circumferential direction in a inner peripheral surface of the main bearing, through an oil gallery formed in a cylinder block wall and a through-hole formed in a wall portion of the main bearing. The crankshaft also has a first lubricating oil passage which penetrates through the journal portion in a radial direction and of which both end openings communicate with the lubricating oil groove of the main bearing, a second lubricating oil passage which branches from the first lubricating oil passage to extend through a crank arm portion, and a third lubricating oil passage which connected with the second lubricating oil passage and penetrate through a crank pin in the radial direction so that both ends thereof open on an outer peripheral surface of the crank pin, whereby the lubricating oil supplied into the lubricating oil groove of the main bearing is further supplied into a lubricating oil groove formed in a circumferential direction on the inner peripheral surface of a connecting rod bearing for the crank pin portion of the crankshaft through the first lubricating oil passage, the second lubricating oil passage and the third lubricating oil passage (see JP-A-08-277831, for example).

At the time of initial operation of the internal combustion engine, foreign matters remaining in the lubricating oil passage, that is, swarf generated by metal processing at the time of cutting of the oil passage, molding sand at the time of molding and the like tend to mix into the lubricating oil which is supplied to the slide bearings for the crankshaft such as the aforementioned main bearing and connecting rod bearing. In the case of the conventional slide bearings for an internal combustion engine, these foreign matters accompany the flow of the lubricating oil on the bearings as the crankshaft rotates, but are discharged outside the bearings together with the lubricating oil through a gap formed between the bearings and a shaft portion by crush reliefs, chamfers and the like which are formed in end portions in a circumferential direction of the bearings.

As shown in FIG. 12, the aforementioned crush relief corresponds to a relief space 84 formed by reducing the thickness of the wall portion in the end portion region in the circumferential direction of a half bearing 80 by a relief depth RD in the radial direction from an original inner peripheral surface 82 (main circular arc) which is concentric with the center of rotation, and the relief space 84 is formed for absorbing positional displacement and deformation of butt end surfaces of the half bearings which may occur, for example, when the pair of half bearings are installed in the journal portion or the connecting rod of the crankshaft. Accordingly, the position of the center of curvature of the bearing inner peripheral surface in the end portion region in the circumferential direction of the half bearing in which the crush relief is formed differs from the position of the center of curvature of the bearing inner peripheral surface (main circular arc) in the remaining region (refer to SAE J506 (item 3.26 and item 6.4), DIN 1497, section 3.2, JIS D3102). The crush relief has a relief length RL, which is expressed as the height to an upper edge of the crush relief formation region from a horizontal surface, measured when the half bearing is placed so that both ends thereof in the circumferential direction are placed on the horizontal surface as lower end surfaces, and the relief depth RD is formed so as to be gradually smaller toward a central portion from the end portion in the circumferential direction of the bearing throughout the relief length RL.

In the conventional configuration, the relief length RL and the relief depth RD of the crush relief are constant along the entire half bearing in the axial direction (width direction) of the half bearing (see JP-A-2008-095858, paragraphs 0043, 0045, 0047 and the like, and JP-A-2005-069283).

JP-U-04-063810 shows another configuration of the crush relief where the relief length RL and the relief depth RD are not constant along the entire half bearing in the axial direction.

BRIEF SUMMARY OF THE INVENTION

In the internal combustion engines of recent years, an oil pump has been reduced in size for the purpose of reducing fuel consumption, and therefore, the supply amount of the lubricating oil to the bearing sliding surfaces has been decreased as compared with the internal combustion engines of the past. Accordingly, if the crush relief is formed as in the conventional bearing, foreign matters are discharged from it, but since the leaking amount of the lubricating oil is large, insufficient supply of the lubricating oil to the bearing sliding surface occurs.

FIG. 13 shows conventional oil flows, and when the relief length RL of the crush relief is constant in the axial direction, an oil flow FC in the bearing center goes in a straight line across the crush relief with relative rotation of the shaft and the bearing, but in an oil flow FS at the end portion side in the axial direction, a flow FS' which is discharged outside increases whereas a flow FS" which goes in a straight line decreases, since the distance to the end portion in the axial direction is short, and this makes it difficult to form a favorable oil film on the bearing inner peripheral surface.

As a countermeasure against oil leakage from the conventional crush relief, if a crush relief non-formation region (which is formed by the bearing inner peripheral surface) is simply provided at both sides in the axial direction of the crush relief to substantially close the gap between the shaft surface and the bearing inner peripheral surfaces, the oil leakage amount becomes small. In this case, however, there arises the problem that the foreign matters included in the oil are difficult to discharge. If a large number of foreign matters pass the crush relief without being discharged to go in the flow FS" direction of FIG. 13 and enter the bearing sliding surface, troubles such as seizure, wear and the like are likely to occur in the sliding surface.

Accordingly, an object of the present invention is to provide a slide bearing such as a main bearing and a connecting bearing for a crankshaft, having an improved crush relief with a small oil leakage amount in order to promote oil film formation on a bearing sliding surface and excellent dischargeability of foreign matters included in lubricating oil.

In order to achieve the aforementioned object, according to one aspect of the present invention, there is provided a slide bearing for a crankshaft of an internal combustion engine, including a pair of half bearings combined with each other to form the slide bearing, and a crush relief formed in each end portion region in a circumferential direction of an inner peripheral surface of each of the half bearings by reducing a bearing wall thickness over an entire width in an axial direction of the half bearing, wherein a relief depth RD which is a reduction amount of the bearing wall thickness of the crush relief is maximum at each end portion in the circumferential direction of the half bearing, and gradually decreases toward the center in the circumferential direction of the bearing half, while the relief depth RD is maximum in the center in an axial direction of the half bearing of the bearing half, and gradually decreases toward both end portions in the axial direction of the bearing half.

The slide bearing according to the present invention is preferably made such that a relief length RL of the crush relief which is expressed as a height from a horizontal surface to an upper edge of the crush relief on the bearing inner peripheral surface measured when each the half bearings is placed on the horizontal surface so that both end surfaces in the circumferential direction thereof become lower end surfaces is maximum RL1 in the center in the axial direction, and a relief length RL3 of the crush relief in each position in the axial direction separated from the center in the axial direction by a distance corresponding to ¼ of the entire width in the axial direction of the half bearing is 60% to 90% of the maximum relief length RL1.

The slide bearing according to the present invention is preferably made such that the relief length RL1 of the crush relief in the center in the axial direction of the half bearing is 3 mm to 15 mm, and a relief length RL2 of the crush relief at each of the end portions in the axial direction is 0.1 mm to 2 mm. Further, the slide bearing according to the present invention is preferably made such that the relief depth RD of the crush relief at each of the end portions in the circumferential direction of the half bearing is 0.01 mm to 0.05 mm in the central portion in the axial direction, and is 0.005 to 0.02 mm at each of the end portions in the axial direction.

According to the present invention, the upper edge of the crush relief may be configured to draw an arc on the bearing inner peripheral surface, or may be configured to be in a shape of a straight line on the bearing inner peripheral surface.

According to the slide bearing for a crankshaft of an internal combustion engine having the improved crush relief of the present invention, foreign matters included in the lubricating oil can be properly discharged, and the exhaust amount of the lubricating oil from the crush relief formation portion can be reduced. Thereby, oil film formation on the bearing inner peripheral surface can be made favorable while the risk of troubles such as seizure, wear and the like of the sliding surface of the slide bearing is reduced.

Further, according to the slide bearing for a crankshaft of an internal combustion engine having the improved crush relief of the present invention, when the lubricating oil which flows in the circumferential direction with relative rotation of the bearing and the shaft passes the crush relief formation portion, the flows of the oil easily gather toward the center in the axial direction, and thereby, the oil film formation on the bearing inner peripheral surface can be made more favorable. Further, since by the crush relief which has a preferable size according to the present invention, the flows of the oil easily gather toward the center in the axial direction, but do not excessively concentrate on the center, the oil does not have excessively high pressure in the center in the axial direction of the crush relief, and accordingly, the slide bearing in which the flow of the oil in the center is not hindered is provided.

The other objects, features and advantages of the present invention will become apparent from the following description of the embodiments of the present invention relating to the accompanying drawings.

DETAILED DESCRIPTION OF THE INVENTION

Embodiment 1

Figure 1:
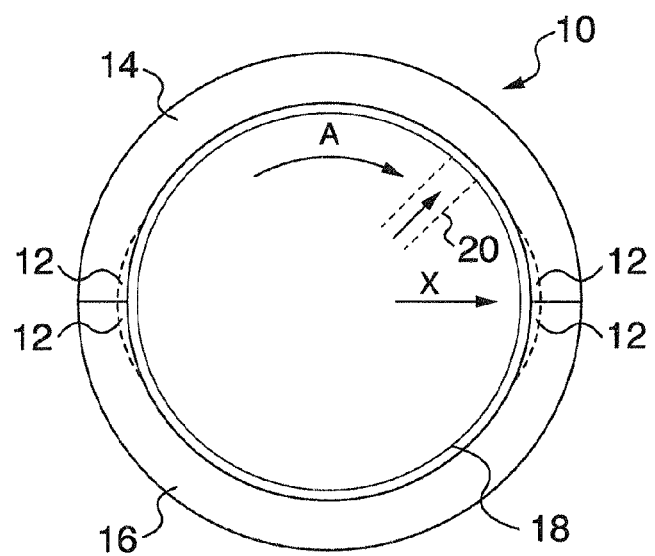
FIG. 1 is a side view of a slide bearing having a crush relief according to one embodiment of the present invention.
Figure 2:
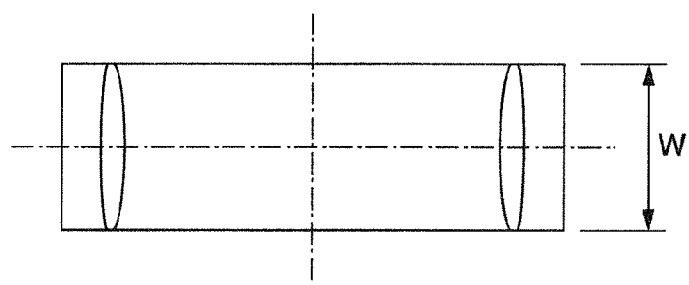
FIG. 2 is a view of a half bearing of the slide bearing shown in FIG. 1 seen from an inner peripheral surface side.

FIG. 1 shows a slide bearing 10 including crush reliefs 12 according to one embodiment of the present invention. In this case, the slide bearing 10 is a connecting rod bearing constituted of a pair of half bearings 14 and 16, and is disposed between a connecting rod (not illustrated) and a crank pin portion 18 of a crankshaft of an internal combustion engine. An arrow A of FIG. 1 shows a rotational direction of the crank pin portion 18. A lubricating oil passage 20 is formed inside the crank pin portion 18, and lubricating oil is supplied from the lubricating oil passage 20 to a bearing sliding surface. In FIG. 1, a gap between the crank pin portion 18 and an inner peripheral surface of the slide bearing 10 is shown to be larger than an actual scale, but it should be noted that FIG. 1 is only a schematic view, and a person skilled in the art can actually select a suitable gap.

Figure 3:
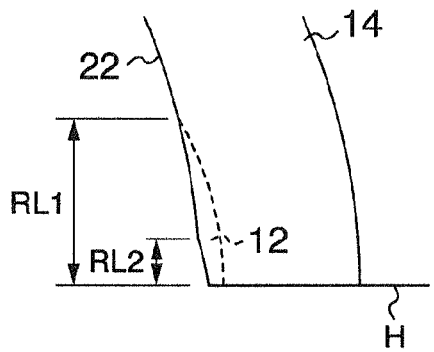
FIG. 3 is an enlarged side view of an end portion in a circumferential direction of a half bearing of the slide bearing shown in FIG. 1.
Figure 4:
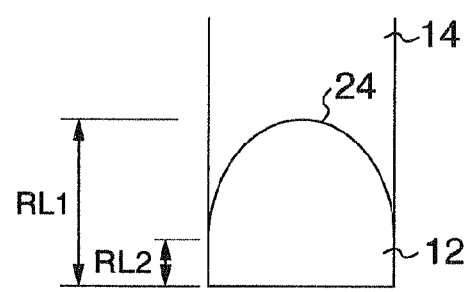
FIG. 4 is a view of the end portion in the circumferential direction of the slide bearing shown in FIG. 3 seen from a rotation center side.
Figure 5:
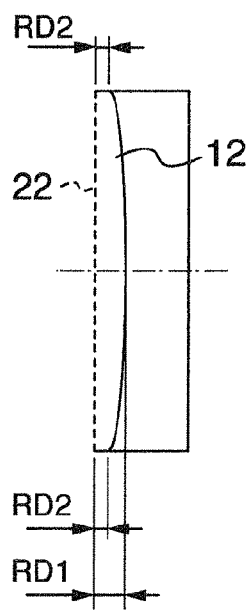
FIG. 5 is an enlarged view of the end portion in the circumferential direction of the half bearing shown in FIG. 2.

As is understood from FIGS. 2 to 5, the crush relief 12 is formed over a width W of the bearing by reducing the thickness of a wall portion in the region of the end portion in the circumferential direction of the half bearing 14 by a relief depth RD in a radial direction from an original inner peripheral surface (main circular arc) 22 of the bearing. The relief depth RD of the crush relief 12 at the end portion in the circumferential direction of the half bearing 14 is maximum (RD1) in the central portion in the axial direction, gradually decreases toward the end portion in the axial direction from the central portion, and becomes minimum (RD2) at the end portion in the axial direction (FIG. 5). The relief depth RD gradually decreases toward the central portion in the circumferential direction, and becomes zero at an upper edge 24 of the crush relief 12 (FIGS. 3 and 4).

Further, as shown in FIGS. 3 and 4, a relief length RL of the crush relief, which is the height from a horizontal surface H to an upper edge of the crush relief 12 measured when the half bearing 14 is placed so that both ends in the circumferential direction of the half bearing 14 are placed on the horizontal surface H as lower end surfaces, is maximum (RL1) in the central portion in the axial direction, gradually decreases toward the end portion in the axial direction from the central portion, and becomes minimum (RL2) at the end portion in the axial direction. In the case of the embodiment in which the relief depth RD of the crush relief 12 is formed to draw an arc as shown in FIG. 5, the upper edge 24 of the crush relief 12 is also configured to draw an arc on the bearing inner peripheral surface.

Figure 6:
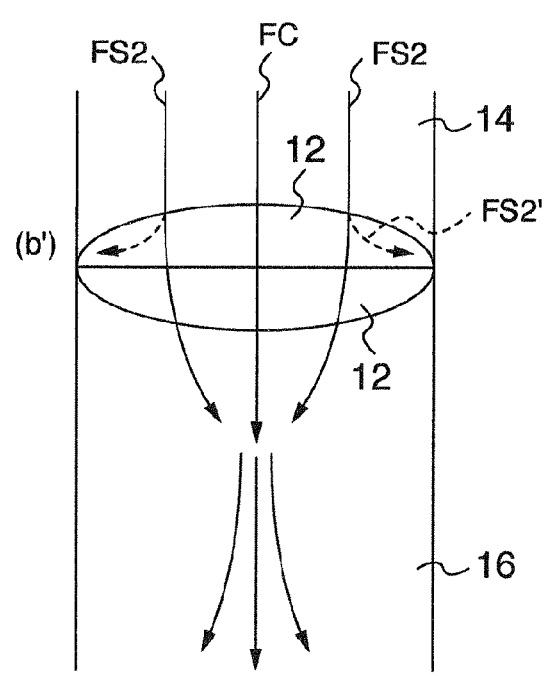
FIG. 6 is a view seen along the arrow X of a joint portion of the slide bearing shown in FIG. 1 seen from the rotation center side.
Figure 13:
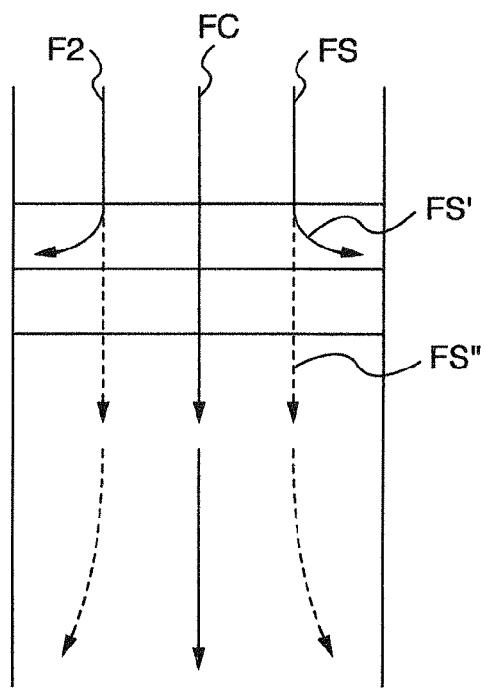
FIG. 13 is a view of a joint portion of a slide bearing including the conventional crush relief shown in FIG. 12 seen from an inner peripheral surface side.

FIG. 6 is a view seen along the arrow X of the portion of the crush relief 12 of the slide bearing 10 shown in FIG. 1 seen from the inner peripheral surface side, and the main flows of the lubricating oil are shown by the arrows of the solid lines, and partial flows are shown by the dotted lines. The lubricating oil which is supplied to the sliding surface of the bearing flows from the inner peripheral surface of the half bearing 14 of the upper side to the inner peripheral surface of the half bearing 16 of the lower side as the crank pin portion 18 of the crankshaft rotates. At this time, lubricating oil FC which flows in the central portion in the axial direction of the inner peripheral surface flows toward the central portion of the inner peripheral surface at the lower side. After lubricating oil FS2 which flows on the end portion side in the axial direction of the inner peripheral surface passes the inner peripheral surface and edge portions of the crush relief 12, a main part flows to the central portion in the axial direction, and a part of it (FS2') flows to the end portion side in the axial direction. Since the relief length RL and the relief depth RD thereof are maximum at the central portion in the axial direction of the bearing in the crush relief 12, and gradually become smaller toward both end portions in the axial direction of the bearing, the oil leakage amount from the release portions of the crush relief 12 in both the end portions in the axial direction is small at this time. Since the lubricating oil which flows toward the central portion in the axial direction of the half bearing 16 of the lower side flows toward the axial direction of the bearing while flowing on the inner peripheral surface of the half bearing 16 of the lower side across the crush relief 12, the amount of oil which is discharged from the axial end portion becomes small as compared with the conventional flow (FIG. 13), and oil film formation on the inner peripheral surface of the bearing becomes favorable. In this case, the foreign matters also flow to the end portion in the axial direction in the region where the crush relief 12 is formed, by the flow FS2', and can be discharged outside.

In the present embodiment, the relief length RL1 in the central portion in the axial direction of the crush relief 12 is preferably 3 to 15 mm, and this is similar to the size of the conventional relief length RL constant in the axial direction, which is the relief length RL of the ordinary crush relief formed in the conventional slide bearing. The reason of this is that if the relief length RL1 is less than 3 mm, in the event when the positions of the end surfaces in the circumferential direction are displaced by combining a pair of half bearings and a level difference occurs on the inner peripheral surface side of the bearing, the effect of mitigating oil film breakage caused by this level difference becomes insufficient. Further, the reason why the relief length RL1 is set at 15 mm or less is that if the relief length RL1 of the crush relief is made excessively large, the area of the inner peripheral surface of the bearing which receives load from the crankshaft becomes small.

Meanwhile, a relief length RL2 at the end portion in the axial direction of the crush relief 12 is preferably 0.1 to 2 mm. The relief length RL2 at the end portion in the axial direction of the crush relief 12 is preferably made as small as possible, as long as foreign matters are discharged, in order to reduce the oil leakage amount from the end portion in the axial direction of the bearing.

Figure 7:
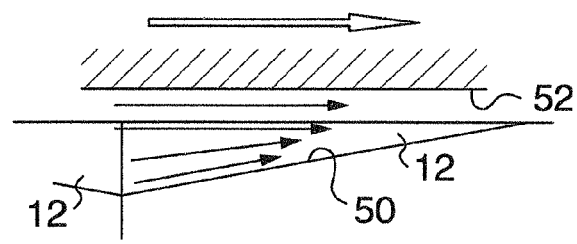
FIG. 7 is a schematic view for explaining flows of oil between a crush relief formation portion of the slide bearing and a shaft.
Figure 8:
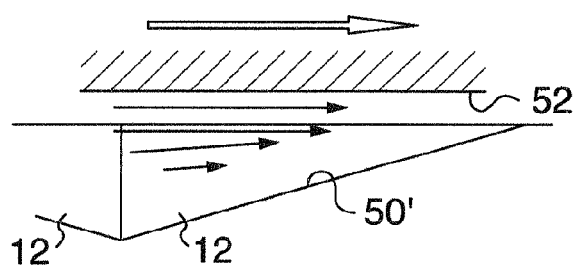
FIG. 8 is another schematic view for explaining the flows of oil between the crush relief formation portion of the slide bearing and a shaft.

Further, a relief depth RD 1 in the central portion in the axial direction of the crush relief 12 in the end portion in the circumferential direction of each of the half bearings is preferably 0.01 to 0.05 mm, and this is similar to the size of the conventional relief depth RD of the ordinary crush relief formed in the conventional slide bearing which depth RD is constant in the axial direction. The reason of this is that if the relief depth RD1 is less than 0.01 mm, in the event when the positions of the end surfaces in the circumferential direction are displaced by combining a pair of half bearings and a level difference is formed on the inner peripheral surface side of the bearing, the effect of mitigating oil film breakage caused by the level difference becomes small. Further, if the maximum relief depth RD1 of the crush relief 12 in the end portion in the axial direction is suitable as shown in FIG. 7, the lubricating oil between a bottom surface 50 of the crush relief 12 and a counterpart shaft surface 52 accompanying the surface of the shaft which is rotated is fed in the circumferential direction as shown by the arrows, but if the counterpart shaft surface 52 and a bottom surface 50' of the crush relief 12 are excessively alienated as shown in FIG. 8, the action from the counterpart shaft surface on the lubricating oil of the bottom portion becomes small, the amount of the lubricating oil which flows to the inner peripheral surface (sliding surface) on the front side of the bearing decreases, and the amount of oil which leaks from the end portion in the axial direction of the bearing becomes large. Thus, the maximum relief depth RD1 of the crush relief is set at 0.05 mm or less, whereby the action from the counterpart shaft surface is exerted over the entire lubricating oil between the bottom surface 50 of the crush relief 12 and the counterpart shaft surface 52, and supply of the lubricating oil to the inner peripheral surface (sliding surface) on the front side of the bearing becomes sufficient.

Meanwhile, a relief depth RD2 at the end portion in the axial direction of the crush relief 12 in the end portion in the circumferential direction of each of the half bearings is preferably 0.005 to 0.02 mm. The relief depth RD2 is preferably made as small as possible, as long as the foreign matters included in the lubricating oil are discharged outside the bearing, in order to reduce the leakage amount of the lubricating oil. In this case, while the relief depths RD1 and RD2 of the crush relief 12 are partially overlapping in range, this is because the relief depth needs to be made larger when the inside diameter size of the bearing becomes larger, but it is obvious that the relief depths RD1 and RD2 should be set so as to satisfy the formula of RD1>RD2 within the respective numeric value ranges.

Figure 9:
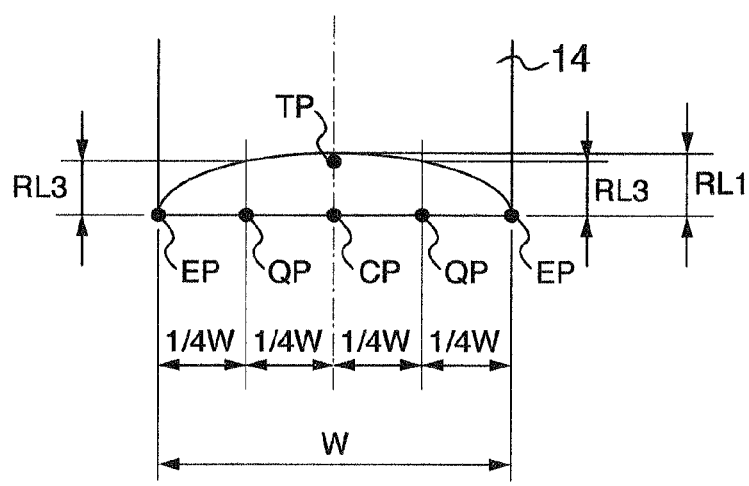
FIG. 9 is a view of the end portion in the circumferential direction of the slide bearing according to the present invention seen from the rotation center side, similar to FIG. 4.

In order to pass the lubricating oil which flows on the inner peripheral surface of the half bearing 14 of the upper side toward the central portion in the axial direction of the inner peripheral surface of the half bearing 16 of the lower side as shown in FIG. 6, a relief length RL3 of the crush relief in each position QP in the axial direction at which the distance from the end portion in the axial direction of the half bearing is ¼ of the length (width) W in the axial direction of the half bearing (more specifically, the central position QP between an axial central position CP and an axial end position EP) is more preferably 60 to 90% of the relief length RL1 of the crush relief in the central portion in the axial direction (FIG. 9). The reason of it is that if the relief length RL3 is less than 60% of the relief length RL1, the crush relief steeply decreases in sectional area in the axial direction in the inner peripheral surface of the half bearing 16 of the lower side, and therefore the pressure of the lubricating oil becomes so high at a tip end portion TP at the center in the axial direction of the crush relief of the half bearing 16 of the lower side that the lubricating oil becomes rather difficult to gather to the central portion, whereas if the relief length RL3 exceeds 90% of the relief length RL1, the lubricating oil easily flows in the circumferential direction, and hardly flows toward the central portion.

Embodiment 2

Figure 10:
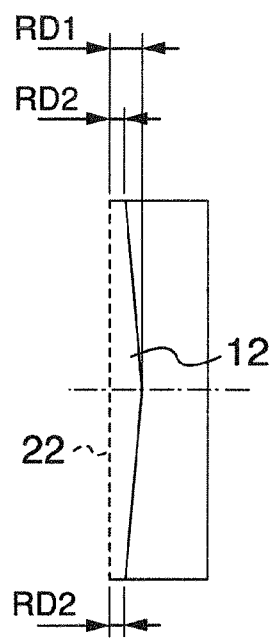
FIG. 10 is an enlarged view of an end portion in a circumferential direction of a half bearing of a slide bearing according to a second embodiment of the present invention.
Figure 11:
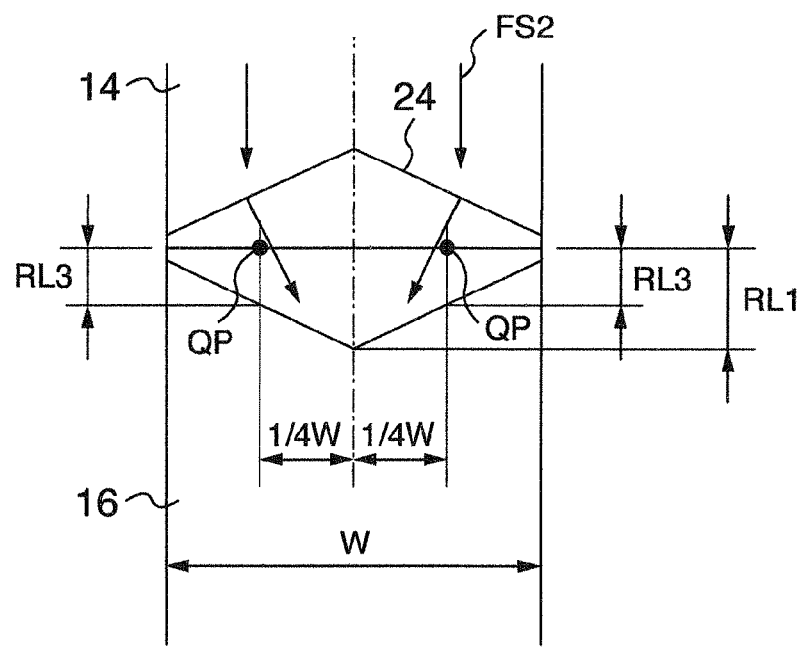
FIG. 11 is a view of a joint portion of the slide bearing according to the second embodiment of the present invention seen from the rotation center side.
Figure 12:
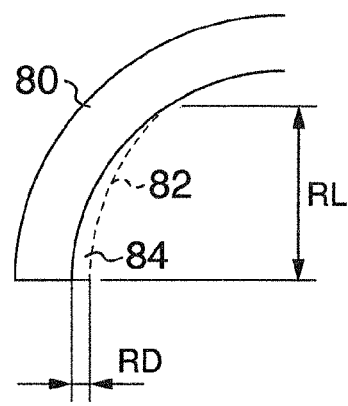
FIG. 12 is an enlarged side view of an end portion in a circumferential direction of a half bearing in which a conventional crush relief is formed.

FIGS. 10 and 11 show a slide bearing according to a second embodiment of the present invention. If the bottom portion of the crush relief 12 is formed in such a manner that the relief depth RD draws a straight line as shown in FIG. 10, the upper edge 24 of the crush relief 12 is also formed into a straight-line shape in the inner peripheral surface of the bearing as shown in FIG. 11. In this case, however, it should be noted that in order to pass the lubricating oil which flows on the inner peripheral surface of the half bearing 14 of the upper side toward the central portion in the axial direction of the inner peripheral surface of the half bearing 16 of the lower side, the relief length RL3 of the crush relief in each of the axial position QP at which the distance from the end portion in the axial direction of the half bearing is ¼ of the length (width) W in the axial direction of the half bearing is set at 60 to 90% of the relief length RL1 of the crush relief at the central portion in the axial direction.

In the above embodiments, it should be noted that the conventional lubricating oil groove which is formed in the circumferential direction of the bearing inner peripheral surface is not shown, or does not have to be always formed. Further, the width dimension of the slide bearing is determined by the capacity of the internal combustion engine, and therefore, does not have to be limited in the present invention. Furthermore, it is obvious that in the slide bearing, a conventional chamfer may be formed at each edge portion, aside from the crush relief, for the purpose of facilitating manufacture and assembly.

The above description is made for several embodiments, but it is obvious to a person skilled in the art that the present invention is not limited thereto, and various modifications and corrections can be made within the range of the spirit and accompanying claims of the present invention.

The invention claimed is:

1. A slide bearing for a crankshaft of an internal combustion engine, comprising
   a pair of half bearings which are combined with each other to form the slide bearing; and
   a crush relief formed in each end portion region in a circumferential direction of an inner peripheral surface of each of the half bearings by reducing a bearing wall thickness over an entire width in an axial direction of the half bearing, wherein
   a relief depth (RD) which is a reduction amount of the bearing wall thickness of the crush relief is at a maximum at each end portion in the circumferential direction of the half bearing, and progressively and continuously decreases toward a center in the circumferential direction of the half bearing, while the relief depth (RD) is at a maximum in a center in an axial direction of the half bearing, and progressively and continuously decreases toward both end portions in the axial direction of the half bearing;
   a relief length (RL) of the crush relief which is expressed as a height from a horizontal surface to an upper edge of the crush relief on the bearing inner peripheral surface measured when the half bearings is placed on the horizontal surface so that both end surfaces in the circumferential direction thereof become lower end surfaces which progressively decrease from a center toward both end portion in the axial direction.

2. The slide bearing according to claim 1,
   wherein the relief length (RL) of the crush relief is at a maximum (RL1) in the center in the axial direction, and
   a relief length (RL3) of the crush relief in each position in the axial direction separated from the center in the axial direction by a distance corresponding to ¼ of the entire width in the axial direction of the half bearing is 60% to 90% of the maximum relief length (RL1).

3. The slide bearing according to claim 1, wherein the relief length (RL1) of the crush relief in the center in the axial direction of the half bearing is 3 mm to 15 mm, and a relief length (RL2) of the crush relief at each of the end portions in the axial direction is 0.1 mm to 2 mm.

4. The slide bearing according to claim 1, wherein the relief depth (RD) of the crush relief at each of the end portions in the circumferential direction of the half bearing is 0.01 mm to 0.05 mm in the central portion in the axial direction, and is 0.005 mm to 0.02 mm at each of the end portions in the axial direction.

5. The slide bearing according to claim 1, wherein an upper edge of the crush relief is configured to draw an arc on the bearing inner peripheral surface.

6. The slide bearing according to claim 1, wherein an upper edge of the crush relief is configured to be in a shape of a straight line on the bearing inner peripheral surface.

* * * * *